(12) United States Patent
Hisamitsu et al.

(10) Patent No.: US 7,364,816 B2
(45) Date of Patent: Apr. 29, 2008

(54) LAMINATE TYPE BATTERY AND METHOD FOR MANUFACTURING THE SAME

(75) Inventors: Yasunari Hisamitsu, Yokosuka (JP); Hideaki Horie, Yokosuka (JP); Kouichi Nemoto, Zushi (JP); Yasuhiko Ohsawa, Yokosuka (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 304 days.

(21) Appl. No.: 10/700,624

(22) Filed: Nov. 5, 2003

(65) Prior Publication Data

US 2004/0126655 A1 Jul. 1, 2004

(30) Foreign Application Priority Data

Dec. 27, 2002 (JP) .................... P 2002-380598

(51) Int. Cl.
  *H01M 6/46* (2006.01)
  *H01M 2/16* (2006.01)
  *H01M 2/18* (2006.01)

(52) U.S. Cl. .................. 429/152; 429/144; 429/141

(58) Field of Classification Search ............... 429/152, 429/121, 178, 141, 144
See application file for complete search history.

(56) References Cited

U.S. PATENT DOCUMENTS 4,204,036 A * 5/1980 Cohen et al. ............... 429/152
4,637,970 A 1/1987 Yeh et al.
6,160,375 A * 12/2000 Horie et al. ................ 320/116
6,743,546 B1 * 6/2004 Kaneda et al. ............. 429/127

FOREIGN PATENT DOCUMENTS

| JP | 56-63779 | 5/1981 |
| JP | 4-366564 A | 12/1992 |
| JP | 6-231796 A | 8/1994 |
| JP | 9-45369 A | 2/1997 |
| JP | 11-123826 A | 5/1999 |
| JP | 2000-502206 A | 2/2000 |

* cited by examiner

*Primary Examiner*—Patrick Joseph Ryan
*Assistant Examiner*—Ben Lewis
(74) *Attorney, Agent, or Firm*—McDermott Will & Emery LLP

(57) ABSTRACT

A laminate type battery comprises a substrate, a power generating element which has at least one single cell made by a positive electrode layer, an electrolyte layer and a negative electrode layer which are sandwiched by collecting layers from both sides thereof, and an electric circuit portion having electrode terminals which connect the collecting layers to an external device and circuitries which connect the collecting layers and the electrode terminals. In the battery, the power generating element and the electric circuit portion are formed by stacking a plurality of layers on the substrate, and each of the layers is configured such that the power generating element and the electric circuit portion are formed by stacking the layers.

18 Claims, 8 Drawing Sheets

LAMINATE TYPE BATTERY AND METHOD FOR MANUFACTURING THE SAME

BACKGROUND OF THE INVENTION

1. Field of the Invention

The present invention relates to a laminate type battery formed by stacking a plurality of layers and to a method for manufacturing the same.

2. Description of the Related Art

There is a known bipolar battery which is constructed in a manner that bipolar electrodes are formed by applying a positive electrode material and a negative electrode material on both sides of a metal foil serving as a collector by the use of a coater, and a plurality of these bipolar electrodes sandwiches a plurality of electrolyte sheets. This bipolar battery is sealed by a laminate film, and at least two collectors are extended to the outside from the laminate film. These two collectors are connected to electrode terminals, enabling the battery and an external device to be connected to each other through the electrode terminals.

SUMMARY OF THE INVENTION

However, this bipolar battery has a construction in which many members are combined together and thus has a problem of poor space efficiency.

The present invention was made in consideration of the above-described problems. It is an object of the present invention to provide a laminate type battery with high space efficiency and a method for manufacturing the same.

The first aspect of the present invention provides a laminate type battery, comprising: a substrate; a power generating element which has at least one single cell made by a positive electrode layer, an electrolyte layer and a negative electrode layer, the positive electrode layer, the electrolyte layer and the negative electrode layer being sandwiched by collecting layers from both sides thereof; and an electric circuit portion having electrode terminals which connect the collecting layers to an external device and circuitries which connect the collecting layers and the electrode terminals, wherein the power generating element and the electric circuit portion are formed by stacking a plurality of layers on the substrate, and each of the layers is configured such that the power generating element and the electric circuit portion are formed by stacking the layers.

The second aspect of the present invention provides an assembled battery, comprising: laminate type batteries, each having a substrate; a power generating element which has at least one single cell made by a positive electrode layer, an electrolyte layer and a negative electrode layer, the positive electrode layer, the electrolyte layer and the negative electrode layer being sandwiched by collecting layers from both sides thereof; and an electric circuit portion having electrode terminals which connect the collecting layers to an external device and circuitries which connect the collecting layers and the electrode terminals, wherein the power generating element and the electric circuit portion are formed by stacking a plurality of layers on the substrate, each of the layers is configured such that the power generating element and the electric circuit portion are formed by stacking the layers, and the laminate type batteries are provided on the same substrate and connected to each other in series or parallel.

The third aspect of the present invention provides an assembled battery module, comprising: assembled batteries, each comprising: laminate type batteries, each having a substrate; a power generating element which has at least one single cell made by a positive electrode layer, an electrolyte layer and a negative electrode layer, the positive electrode layer, the electrolyte layer and the negative electrode layer being sandwiched by collecting layers from both sides thereof; and an electric circuit portion having electrode terminals which connect the collecting layers to an external device and circuitries which connect the collecting layers and the electrode terminals, wherein the power generating element and the electric circuit portion are formed by stacking a plurality of layers on the substrate, each of the layers is configured such that the power generating element and the electric circuit portion are formed by stacking the layers, and the laminate type batteries are provided on the same substrate and connected to each other in series or parallel.

The fourth aspect of the present invention provides a method for manufacturing a laminate type battery, the method comprising: stacking a collecting layer, a positive electrode layer, an electrolyte layer and a negative electrode layer on a substrate, wherein at least one layer among the collecting layer, the positive electrode layer, the electrolyte layer and the negative electrode layer is formed by applying at least one fluid for forming each layer on the substrate.

The fifth aspect of the present invention provides a method for manufacturing a laminate type battery, the method comprising: preparing a positive electrode fluid for forming a positive electrode layer, a negative electrode fluid for forming a negative electrode layer, an electrolyte fluid for forming a electrolyte layer, a conductive fluid for forming a collector layer and a electric circuit portion, the electric circuit portion having electrode terminals which connect the collecting layers to an external device and circuitries which connect the collecting layers and the electrode terminals; applying the positive electrode fluid, the negative electrode fluid, the electrolyte fluid and the conductive fluid on a substrate to form the electric circuit portion and a power generating element, the power generating element having at least one single cell made by the positive electrode layer, the electrolyte layer and the negative electrode layer, the positive electrode layer, the electrolyte layer and the negative electrode layer being sandwiched by the collecting layers from both sides thereof, wherein the power generating element and the electric circuit portion are formed by applying the positive electrode fluid, the negative electrode fluid, the electrolyte fluid and the conductive fluid onto a predetermined region on the substrate in a predetermined order while overlaying the fluids.

BRIEF DESCRIPTION OF THE DRAWINGS

The invention will now be described with reference to the accompanying drawings wherein.

DETAILED DESCRIPTION OF THE PREFERRED EMBODIMENTS

Preferred embodiments of a laminate type battery and a manufacturing method thereof according to the present invention will be detailed hereinbelow with reference to the attached drawings.

First Embodiment

The laminate type battery according to the first embodiment will be described hereinbelow with reference to the drawings.

Figure 1:
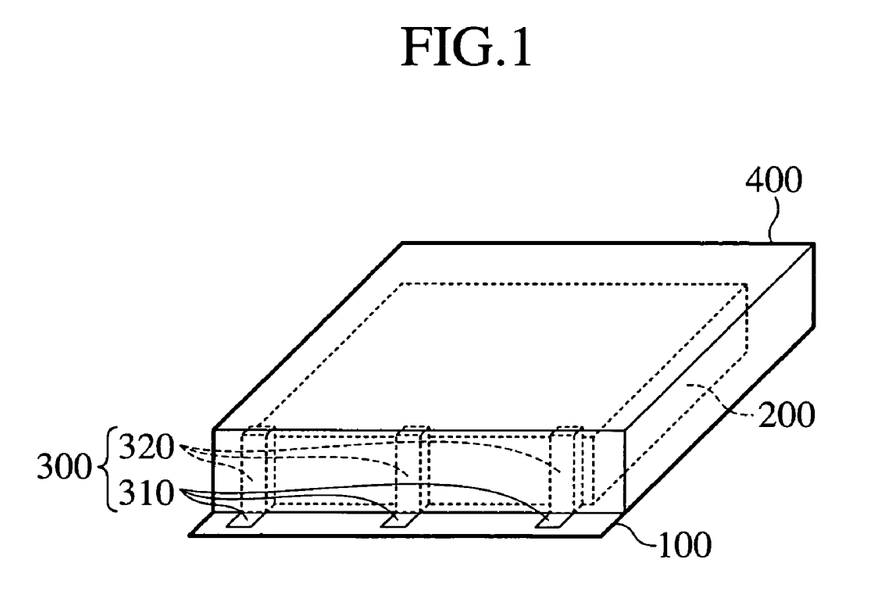
FIG. 1 is a perspective view showing a laminate type battery of embodiment 1 according to the present invention.
Figure 5:
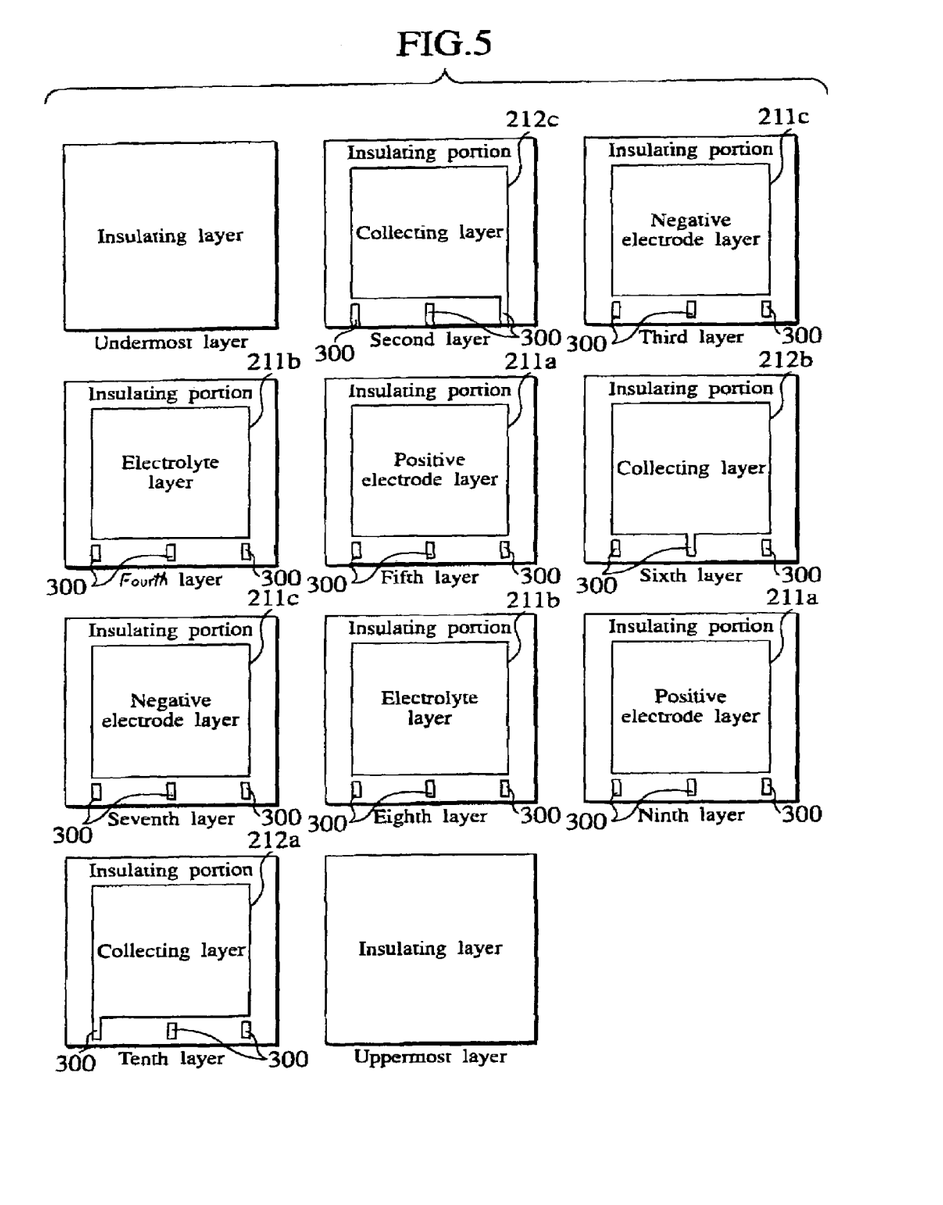
FIG. 5 is a plan view illustrating patterns of respective layers of the laminate type battery according to embodiment 1.

As shown in FIG. 1, the laminate type battery has a substrate 100 on which a plurality of layers is stacked. These layers are configured to form a power generating element 200, an electric circuit portion 300 and an insulating portion 400 when stacked. In other words, each of the layers is patterned so that the power generating element 200, the electric circuit portion 300 and the insulating portion 400 are formed by stacking these layers. Specifically, each of the layers is patterned as shown in FIG. 5, and the laminate type battery is formed by stacking these layers.

The electric circuit portion 300 has electrode terminals 310 for connecting the laminate type battery to an external device, and circuitries 320 for connecting the electrode terminals 310 and the power generating element 200. The electrode terminals 310 are exposed outside, and the power generating element 200 and the electric circuit portion 300 are covered with an insulating portion 400. The power generating element 200 and the electric circuit portion 300 are insulated and sealed by the insulating portion 400. In this embodiment, a cell controller 2000 (see FIG. 4) is connected to all of the electrode terminals 310 as an external device. Here, the cell controller 2000 is for adjusting voltages among the respective electrode terminals in order to charge the battery uniformly. Note that the external device connected to the electrode terminals 310 is not limited to the cell controller 2000 and may be other device such as an electric load device and a charger.

Figure 2:
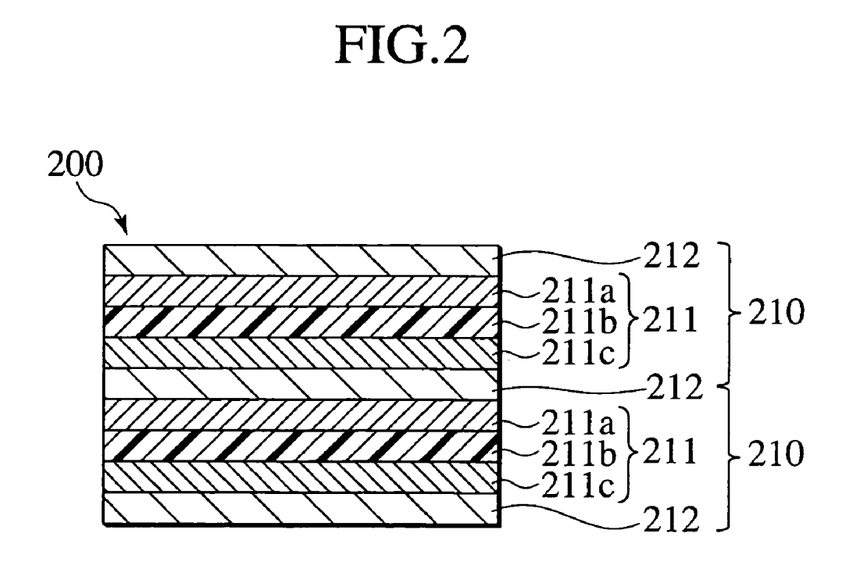
FIG. 2 is a cross-sectional view showing a stacking structure of a power generating element of the laminate type battery according to embodiment 1.

FIG. 2 shows a stacking structure of the power generating element 200. The power generating element 200 of the present invention has two single cells 210 connected in series. Note that the number of the single cells 210 is not particularly limited. Each of the single cells 210 is constituted in a manner that a single cell layer 211, in which an electrolyte layer 211b is placed between a positive electrode layer 211a and a negative electrode layer 211c, is sandwiched between collecting layers 212 from sides of the positive and negative electrode layers 211a and 211c, respectively. As shown in FIG. 2, the positive electrode layer 211a is stacked on one side of the collecting layer 212, and the negative electrode layer 211c is stacked on the other side thereof. Thus, the laminate type battery of this embodiment is a so-called bipolar battery.

Figure 3:
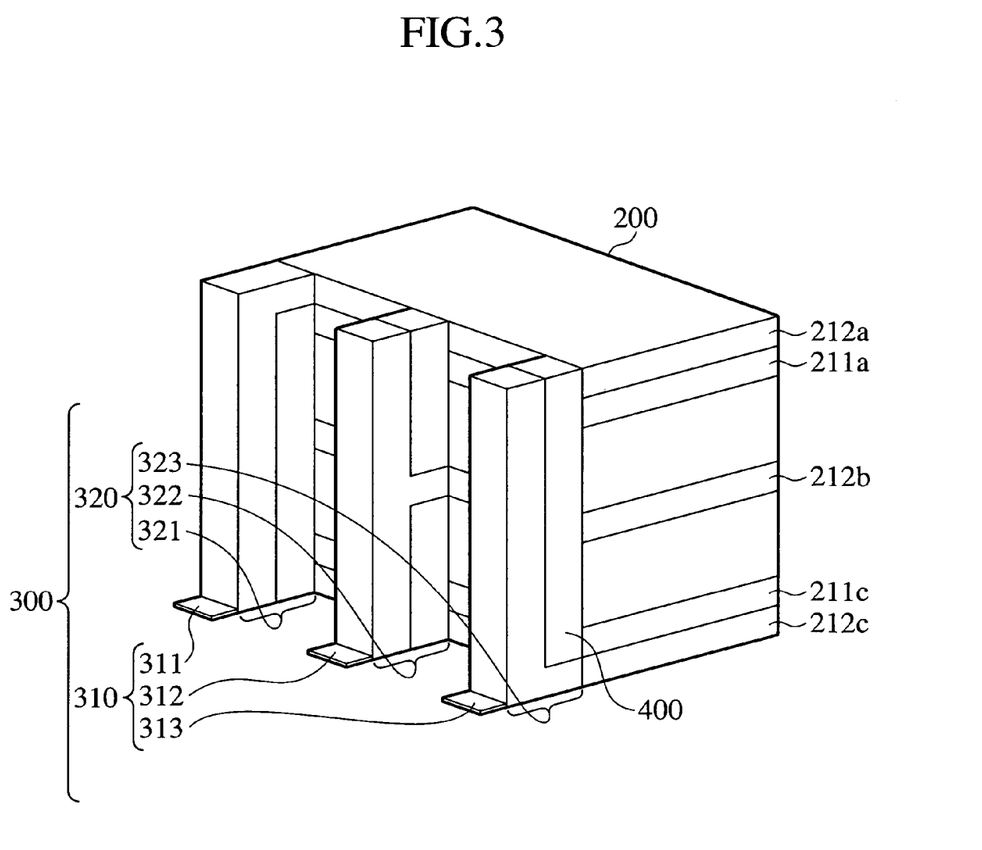
FIG. 3 is a perspective view illustrating an electric circuit portion of the laminate type battery according to embodiment 1.

As shown in FIG. 3, the electric circuit portion 300 has the electrode terminals 310 serving as interfaces for the laminate type battery to exchange electricity with the external device. The electrode terminals 310 include a positive electrode terminal 311, a negative electrode terminal 313 and an intermediate electrode terminal 312. The positive electrode terminal 311 is for connecting the external device and the collecting layer 212a that is present at the end of the power generating element 200 on the side of the positive electrode. layer 211a. The negative electrode terminal 313 is for connecting the external device and the collecting layer 212c that is present at the end of the power generating element 200 on the side of the negative electrode layer 211c. The intermediate electrode terminal 312 is for connecting the external device and the collecting layer 212b that is present in the middle of the power generating element 200. Note that the intermediate electrode terminal 312 does not have to be provided when one single cell 210 is used, or when the collecting layer 212b in the middle of the power generating element 200 is not connected to the external device such as the cell controller 2000. In addition, when the power generating element 200 has the plurality of single cells 210, it is not necessary to provide the intermediate electrode terminal 312 for every one of the collecting layers 212b. The intermediate electrode terminals 312 may be provided as required.

The electric circuit portion 300 has circuitries 320 for connecting these electrode terminals 310 and corresponding collecting layers 212. The circuitries 320 include a first circuitry 321 which connects the positive electrode terminal 311 and the collecting layer 212a, a second circuitry 323 which connects the negative electrode terminal 313 and the collecting layer 212c, and a third circuitry 322 which connects the intermediate electrode terminal 312 and the collecting layer 212b.

The insulating portion 400 is provided for preventing short circuits among each of the members of the laminate type battery, that is, each layer of the power generating element 200, the electrode terminals 310 and the circuitries 320, in particular, short circuits between the positive and negative electrode layers 211a and 211c, and between each members of the laminate type battery and the external device. Moreover, the insulating portion 400 also acts as a sealing member for the power generating element 200 and the circuitries 320.

As described in the forgoing, the laminate type battery according to this embodiment is constructed by the plurality of layers stacked on the substrate, thus realizing the laminate type battery having high space efficiency.

Further, each of the layers is configured (patterned) such that the power generating element 200 and the electric circuit portion 300 are formed by stacking these layers. Therefore, the power generating element 200 and the electric circuit portion 300 are integrally formed and thereby achieving easy manufacturing of the laminate type battery.

Figure 4:
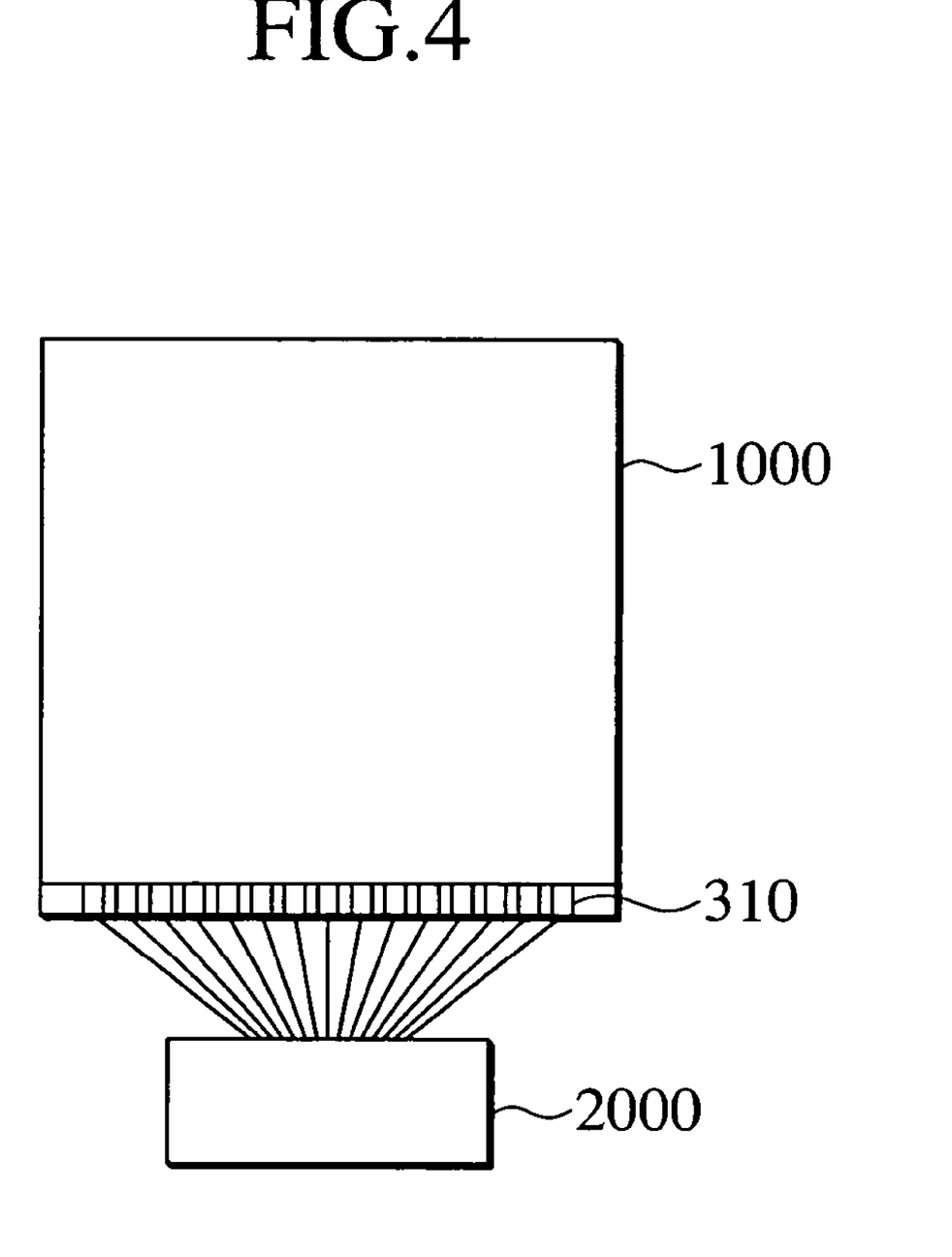
FIG. 4 is a plan view showing the laminate type battery constructed by connecting many single cells in series

Each of the layers mentioned above is configured (patterned) such that the power generating element 200, the electric circuit portion 300 and the insulating portion 400 are integrally formed by stacking these layers. Therefore, the power generating element 200 and the electric circuit portion 300 to be sealed and the insulating portion 400 serving as the sealing member can be integrally formed, thus improving sealability. This effect is significant when the electrode terminals 310 are drawn out from the respective single cells 210 in the laminate type battery in which the many single cells 210 are connected in series. FIG. 4 is a view showing the laminate type battery constructed by connecting many single cells in series. The laminate type battery 1000 has many electrode terminals 310 drawn out from many single cells, respectively, and these electrode terminals 310 are connected to the cell controller 2000. As described hereinabove, according to the construction of the laminate type battery of this embodiment, good sealability can be achieved even when many electrode terminals 310 are provided.

Furthermore, each of the layers mentioned above is configured (patterned) such that the insulating portion 400 is formed by stacking the layers, and thereby preventing short circuits among the respective members of the laminate type battery and between each of the members and the outside.

Moreover, in general, capacity, resistance and the like of these single cells 210 are slightly different from each other. Therefore, when the plurality of single cells 210 is connected to each other in series, voltages of the single cells 210 vary due to repeated charges and discharges. As a result, deterioration gradually progresses from the cell with a relatively high voltage, which shortens the life of the entire battery. However, in the laminate type battery according to this embodiment, the electrode terminals 310 are connected to the cell controller 2000 for adjusting the voltages. Therefore, a favorable charge can be carried out, and a long life of the laminate type battery can be achieved.

In this embodiment, the collecting layers contacting with the positive and negative electrode layers 211$a$ and 211$c$, respectively, are made of the same material. However, the collecting layers can be made of different materials. Specifically, the collecting layers 212 may include two types of layers.

Moreover, the laminate type battery according to this embodiment has the construction where the plurality of single cells 210 is connected in series. However, the laminate type battery may have a construction where the plurality of single cells 210 is connected in parallel. Further, if construction of the layers is changed, various laminate type batteries can be constructed where series and parallel connections are mixed.

Next, a method for manufacturing the laminate type battery according to this embodiment will be described. In the method for manufacturing this embodiment, the respective layers of the laminate type battery are formed by applying fluids, which is for forming the respective layers of the laminate type battery, onto the substrate in a predetermined order. The method for forming the layers by applying fluids includes an ink-jet method, spray printing, electrostatic spraying, sputtering and the like, and the ink-jet method is employed in this embodiment.

In this embodiment, the laminate type battery is manufactured by the use of an ink-jet printer having five printer heads. The five printer heads are for applying a positive electrode fluid for forming the positive electrode layers 211$a$, a negative electrode fluid for forming the negative electrode layers 211$c$, an electrolyte fluid for forming the electrolyte layers 211$b$, a conductive fluid for forming the collector layers 212 and the electric circuit portion 300, and an insulating fluid for forming the insulating portion 400, respectively. By controlling these printer heads, each of the fluid types mentioned above is ejected onto the substrate in a predetermined pattern respectively. After a solvent contained in the fluid is evaporated and the fluid is solidified, each of the fluid types is ejected to overlay the solidified fluid in a predetermined pattern to be formed next. Here, after the fluid is applied, it is preferable to perform heat or optical treatment for the film (the layer) formed by the fluid in order to accelerate evaporation of the solvent or solidification of the fluid. By repeating these operations for predetermined times, a desirable laminate type battery is manufactured.

FIG. 5 is a view showing patterns of the respective layers of the laminate type battery according to this embodiment, that is, ejection patterns of the fluids. The laminate type battery of this embodiment can be manufactured by forming each of the patterns shown in FIG. 5 one after another on the substrate from the first layer to the uppermost layer. This will be specifically described with reference to FIGS. 2, 3 and 5.

First of all, the insulating fluid is ejected from the inkjet printer onto the substrate and then dried, thus forming an insulating layer serving as the lowermost layer. Next, the conductive fluid and the insulating fluid are ejected onto the insulating layer and then dried, thus forming a collecting layer 212$c$ serving as the second layer. At this time, the insulating portion and the electric circuit portion 300 are formed in the periphery of the collecting layer 212$c$. Next, the negative electrode fluid and the insulating fluid are ejected onto the collecting layer 212$c$ and then dried, thus forming the negative electrode layer 211$c$ serving as the third layer. At this time, the insulating portion is formed in the periphery of the negative electrode layer 211$c$. Next, the electrolyte layer 211$b$ that is the fourth layer and the positive electrode layer 211$a$ that is the fifth layer are sequentially formed on the negative electrode layer 211$c$. These layers can be made similarly to the above-mentioned insulating layer and the like. As described above, the respective layers are formed by ejecting the fluids from the ink-jet printer, and thereby the laminate type battery of the present invention can be obtained.

Next, details will be given regarding manufacturing such as materials and a manufacturing apparatus used for the method for manufacturing the laminate type battery according to this embodiment. The laminate type battery described hereinbelow is a laminate type polymer battery.

The substrate 100 is made of an electric insulating material, for example, metal with a thin film of $SiO_2$ insulator deposited thereon.

The positive electrode fluid is made by mixing a positive electrode active material, polymer, a polymerization initiator, a conductive material and a solvent and by adjusting viscosity thereof. In this embodiment, $LiMn_2O_4$, polyethylene oxide PEO), azobisisobutyronitrile (AIBN), acetylene black and N-methyl-2-pyrrolidone (NP) are used as the respective materials. Here, the particle size of the positive electrode active material is within a range of 0.1 μm to 20 μm. This is because, if the particle size is smaller than 0.1 μm, particles of the active materials cannot contact with each other, and thereby contact resistance increases. In addition, if the particle size is larger than 20 μm, a reactive surface of the active material becomes small, and thereby the cell resistance increases. Moreover, if the particle size is larger than 20 μm, the surfaces of the electrode layers become increasingly uneven. Therefore, when a thin electrolyte film is used, a force is applied to a part of the film, and consequently, it becomes more likely that the electrolyte film will break and a short circuit will occur. Preferably, the mass ratio of the positive electrode active material to the entire positive electrode fluid is 80 to 90% in a gel polymer battery and 20 to 60% in an intrinsic polymer (all-solid polymer) battery.

The negative electrode fluid is made by mixing a negative electrode active material, polymer, a polymerization initiator and a solvent and by adjusting viscosity thereof. In this embodiment, a carbon-based material (crushed to have a particle size of 5 μm or smaller), polyethylene oxide PEO), AIBN and NP are used as the respective materials. Here, for the same reason as for the positive electrode active material, the particle size of the negative electrode active material is within a range of 0.1 μm to 20 μm. In addition, it is preferable that the mass ratio of the negative electrode active material to the entire negative electrode fluid is 80 to 90% in a gel polymer battery and 20 to 60% in an intrinsic polymer battery.

The conductive fluid is made by paste of copper fine particles or carbon fine particles and a solvent (NP) used for reducing viscosity of the paste. In this embodiment, the fluid used for forming the collecting layers 212 and the one used for electric circuit portion are the same. However, different fluids may be used therefor. In addition, in this embodiment, the same fluid is used for the collecting layers 212a and 212c contacting with the positive and negative electrode layers 211a and 211c, respectively. However, different fluids can be used therefor. In this case, it is preferable that the fluid for forming the collecting layer 212a on the side of the positive electrode layer 211a contains carbon fine particles, and the fluid for forming the collecting layer 212c on the side of the negative electrode layer 211c contains copper fine particles. Needless to say, in this case, printer heads are required for the fluids, respectively.

The insulating fluid is a polysilazane solution, and the electrolyte fluid is a mixture of polyethylene oxide and NMP.

It is more preferable that the particle sizes of all particles (constituent materials for the battery) contained in each of the fluids are 5 μm or smaller. This is to avoid clogging of a nozzle of the printer head with these particles. Further, in order to prevent the clogging of the nozzle of the printer head, it is preferable to provide the printer head with a clogging prevention filter.

As for the thickness of each of the aforementioned layers, it is preferable that both of the positive and negative electrode layers 211a and 211c have a thickness of 0.5 to 20 μm, the electrolyte layer 211b has a thickness of 0.5 to 50 μm, and the collecting layer 212 has a thickness of 0.1 to 20 μm.

Figure 6:
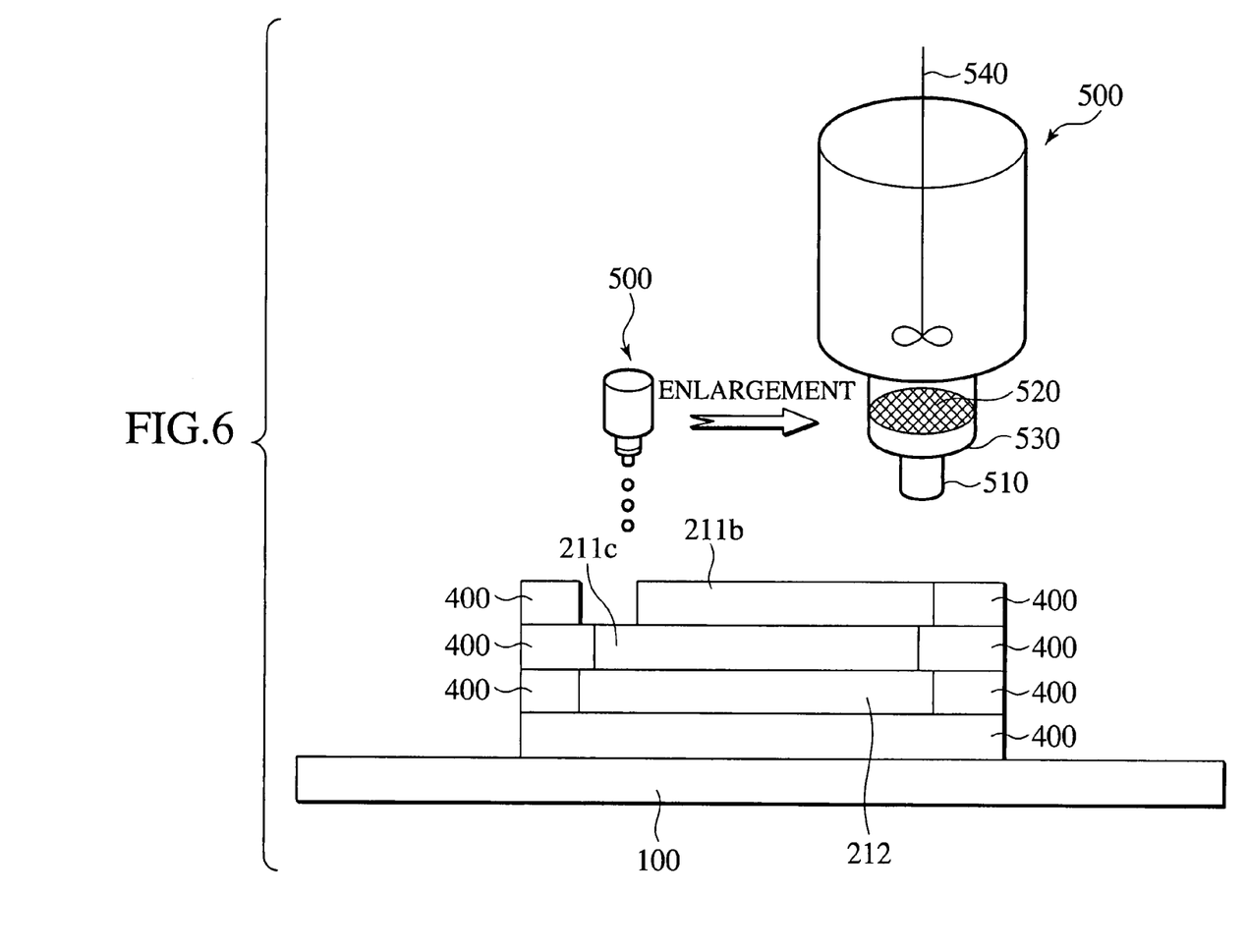
FIG. 6 is a view illustrating a structure of a printer head used in the production of the laminate type battery according to embodiment 1.
Figure 7A:
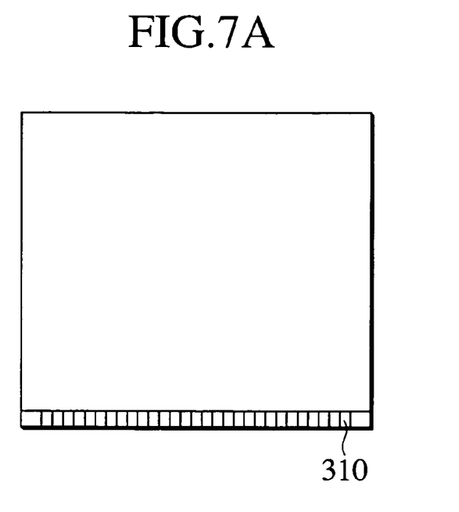
FIGS. 7A, 7B, 7C and 7D are plan views of various types of the laminate type batteries.
Figure 7B:
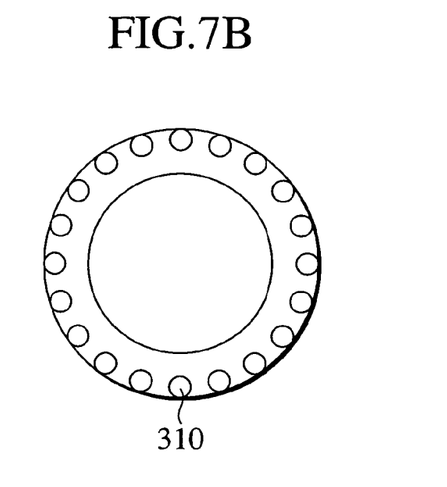
Figure 7C:
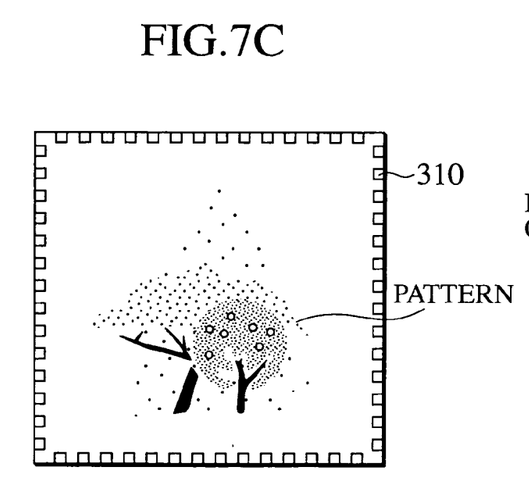
Figure 7D:
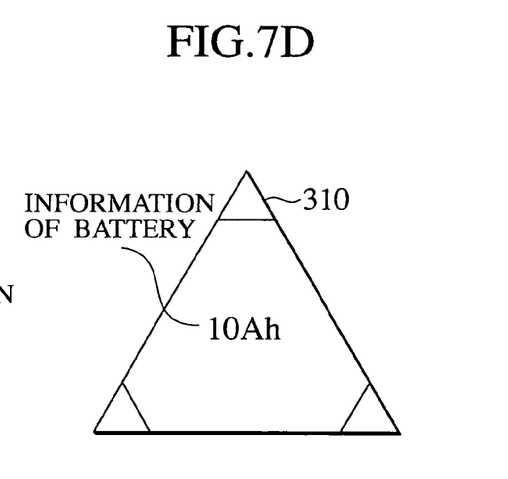

In order to enable application by an existing inkjet printer, the viscosity of the fluid is preferably 20 Pa·s or lower. The viscosity of the fluid can be reduced by adding a solvent. However, if a solvent is added, the active materials become sparse, and thereby electric contact resistance increases between the active materials. Accordingly, it is preferable to reduce the viscosity of the fluid by heating the printer head, instead of adding the solvent. In this embodiment, a ribbon heater is wound on the printer head to heat the fluid inside the printer head. Note that a heating temperature is preferably a temperature at which the solvent does not evaporate and thermal polymerization of the polymer does not occur. FIG. 6 shows a construction of the printer head used in the method for manufacturing this embodiment. In FIG. 6, the clogging prevention filter 520 for preventing the nozzle 510 from being clogged is provided inside the printer head 500. In addition, the ribbon heater 530 is wound in the vicinity of the nozzle 510 as a printer head heating device for heating the printer head 500. Instead of this ribbon heater 530, the clogging prevention filter 520 itself may act as a heater. In other words, the printer head can be heated by the clogging prevention filter 520. By integrating the clogging prevention filter and the heater as mentioned above, the printer head 500 can be miniaturized. In addition, an agitator may be provided inside the printer head in order to maintain a uniform concentration of the fluid within the printer head. In FIG. 6, the impeller 540 is shown as the agitator, but the agitator is not limited thereto.

The polymer contained in the foregoing fluids is preferably encapsulated in microcapsules for its stability. In this case, it is necessary to dissolve the microcapsules by heat treatment after the fluids are applied.

Preferably, the substrate 100 is heated. This is for evaporating the solvent contained in the applied fluids or for thermally polymerizing a polymer component which is not polymerized yet. In this embodiment, the substrate 100 is heated to about 130° C. Further, it is preferable from the viewpoint of efficient heating that the substrate 100 has high thermal conductivity. Furthermore, in order to prevent chemical reactions between the fluids and gasses in the atmosphere, it is preferable to apply and dry the fluids in an inert atmosphere. In this embodiment, the fluids are applied and dried within a chamber with 3% of hydrogen and 97% of nitrogen.

The method for manufacturing the laminate type battery according to the present invention has the following effects.

Since the laminate type battery is manufactured by sequentially applying the plurality of fluids, the manufacturing process can be reduced in comparison with the conventional manufacturing method. In addition, easy manufacturing of the laminate type battery can be realized.

Further, since the fluids are applied while configuring (patterning) required portions only, amounts of the materials to be used can be reduced.

Furthermore, since the pattern and the film thickness of each of the layers can be freely controlled, batteries having various capacities, sizes and shapes can be designed and manufactured easily.

Moreover, uniform thin films can be formed on a plate, and thereby easy manufacturing of a thin high-power battery can be realized. In particular, single cells can be easily stacked, and thereby a high-voltage bipolar battery can be manufactured.

Here, in this embodiment, the fluids are applied using the ink-jet method. Hence, the aforementioned effects can be obtained significantly. This is because the ink-jet method does not require a template unlike the printing method. Additionally, it is easy to control fine sizes with the ink-jet method, whereas it is difficult to control the same with the spraying method and the electrostatic spraying method. Further, since the ink-jet method is used, the shape of the battery, the positions of the electrode terminals 310 and the like can be freely changed. Therefore, patterns, information of the battery or the like can be simultaneously printed as required. FIGS. 7A to 7D show external views of various types of the laminate type batteries.

Incidentally, the battery is not necessarily a finished product once the application of each of the fluids has been completed. There may be additional steps for cutting or sticking the batteries and the like after the fluids are applied and dried.

Second Embodiment

An assembled battery according to the present invention is constituted in a manner that a plurality of the laminate type batteries of the first embodiment is provided on the same substrate and connected to each other either in series or parallel. This embodiment will be described hereinbelow with reference to the drawings, but description of the constituents corresponding to those of the first embodiment will be omitted.

Figure 8:
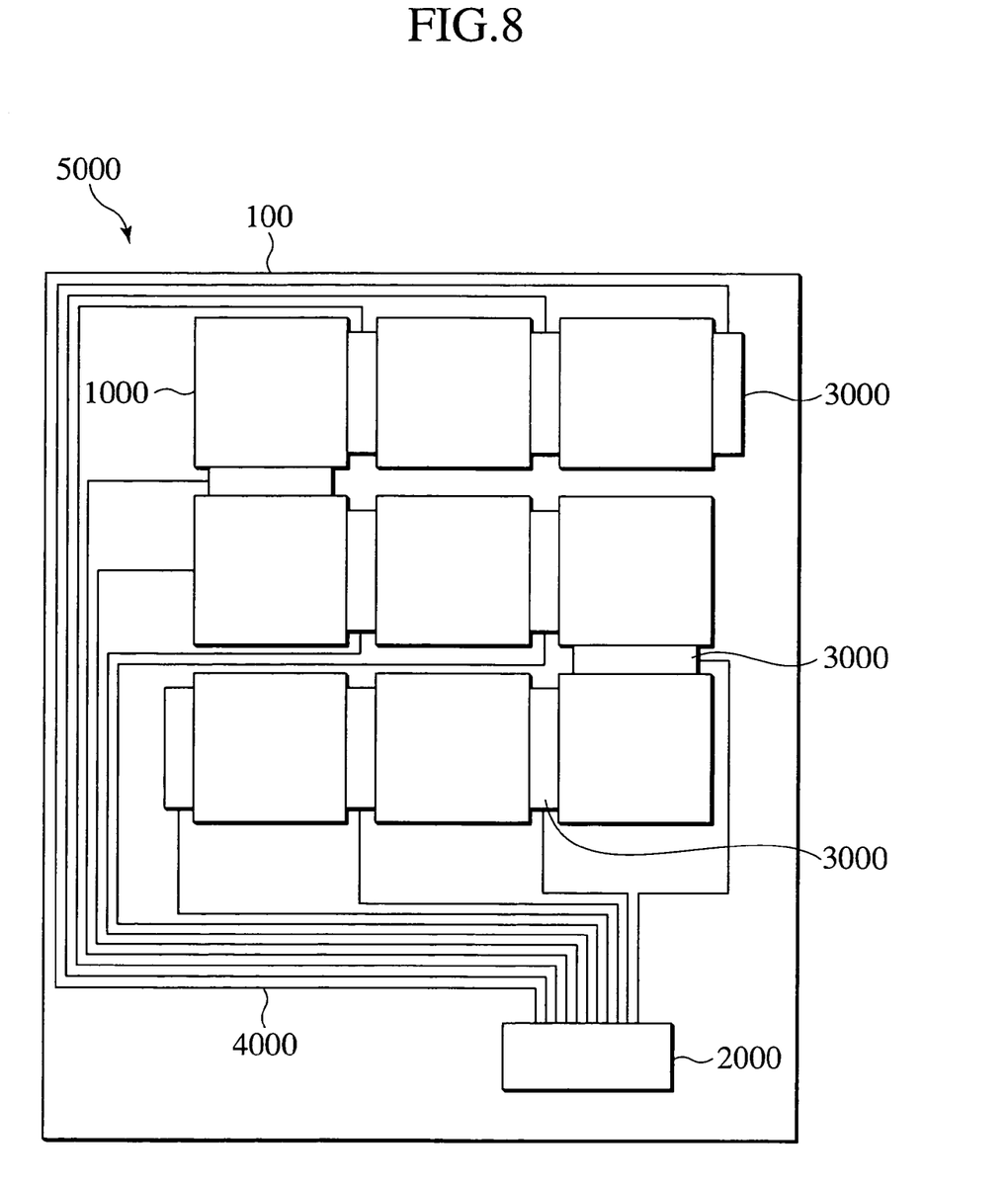
FIG. 8 is a plan view showing an assembled battery of embodiment 2 according to the present invention.

In FIG. 8, a plurality of laminate type batteries 1000 is provided on the same substrate 100 and connected to each other by tabs 3000. In this embodiment, the plurality of laminate type batteries 1000 are connected to each other in series, and each of the tabs 3000 is connected to a cell controller 2000 by lines 4000. The tabs 3000 are wide metal thin films and the tab portion 3000 and the lines 4000 are made on the substrate 100. The tabs 3000 are made wide in order to minimize internal resistance.

The assembled battery 5000 according to this embodiment is manufactured by use of the manufacturing method similar to that for the laminate type battery according to the first embodiment. With the ink-jet method, in particular, the assembled battery 5000 according to this embodiment can be easily manufactured.

In the assembled battery 5000 according to this embodiment, the plurality of laminate type batteries 1000 is provided on the same substrate. Therefore, a thin high-power battery can be realized.

In this embodiment, the plurality of the laminate type batteries 1000 is connected to each other in series. However, the laminate type batteries may be connected to each other in parallel.

Moreover, an assembled battery module can be constructed by connecting a plurality of the assembled batteries of this embodiment in series or parallel. Using this assembled battery module, a thin high-power battery with even higher power can be realized.

Figure 9A:
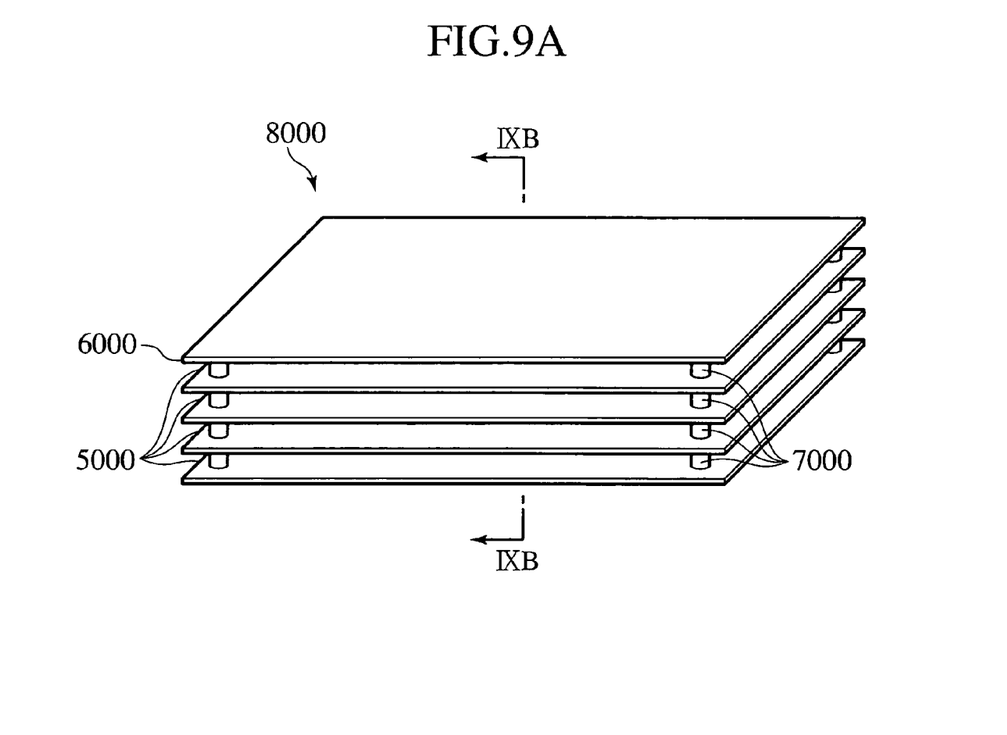
FIG. 9A is a perspective view showing an assembled battery module of embodiment 2 according to the present invention.
Figure 9B:
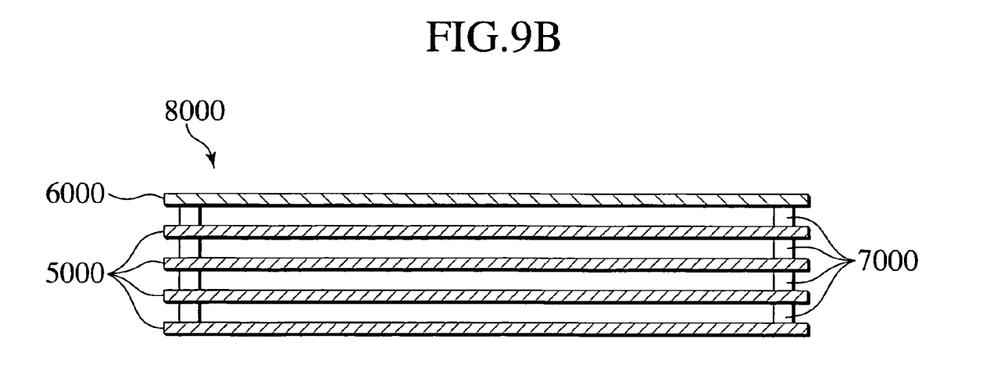
FIG. 9B is a cross-sectional view taken on line IXB-IXB of FIG. 9A.

As shown in FIGS. 9A and 9B, the assembled battery module 8000 of the present invention has a construction where the plurality of assembled batteries 5000 is stacked through metal parts 7000. On the uppermost surface of the assembled battery module 8000 formed by stacking the assembled batteries 5000, a protection sheet 6000 is provided so that the assembled battery at the top surface can be protected from outside. In this assembled battery module 8000, the cell controller 2000 may be mounted within the assembled battery module 8000 if it can be made sufficiently small, or may be provided outside of the assembled battery module 8000 if it is large. Further, the height of the metal parts 7000 can be appropriately adjusted in accordance with the thickness of the assembled battery 5000. In FIGS. 9A and 9B, four assembled batteries 5000 are stacked. However, the number of stacked batteries can be freely set in accordance with an intended usage.

The entire content of a Japanese Patent Application No. P2002-380598 with a filing date of Dec. 27, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A laminate type battery, comprising:
   a substrate;
   a power generating element which is disposed on the substrate and has at least one single cell made of a positive electrode layer, an electrolyte layer, a negative electrode layer, a first collecting layer and a second collecting layer, the positive electrode layer, the electrolyte layer and the negative electrode layer being sandwiched by the first and second collecting layers from both sides thereof; and
   an electric circuit member which is disposed on the substrate and has electrode terminals connected to an external device and circuits connecting collecting layers provided in the power generating element and the electrode terminals,
   wherein the single cell and at least a part of the circuits are formed by stacking:
      a first layer which includes the first collecting layer, first circuit parts and a first insulating portion, wherein the first circuit parts and the first insulating portion are formed in the periphery of the first layer;
      a second layer which includes the negative electrode layer, second circuit parts and a second insulating portion, and is stacked on the first layer, wherein the second circuit parts and the second insulating portion are formed in the periphery of the second layer;
      a third layer which includes the electrolyte layer, third circuit parts and a third insulating portion, and is stacked on the second layer, wherein the third circuit parts and the third insulating portion are formed in the periphery of the third layer;
      a fourth layer which includes the positive electrode layer, fourth circuit parts and a fourth insulating portion, and is stacked on the third layer, wherein the fourth circuit parts and the fourth insulating portion are formed in the periphery of the fourth layer; and
      a fifth layer which includes the second collecting layer, fifth circuit parts and a fifth insulating portion, and is stacked on the fourth layer, wherein the fifth circuit parts and the fifth insulating portion are formed in the periphery of the fifth layer, and the circuits are formed by stacking the first to fifth circuit parts so as to electrically connect each other.

2. A laminate type battery according to claim 1, wherein the power generating element has a plurality of the single cells connected to each other in series, and the electric circuit member comprises:
   a positive electrode terminal electrically connecting the external device and the collecting layer on one end of the power generating element, which is on the positive electrode layer;
   a negative electrode terminal electrically connecting the external device and the collecting layer on the other end of the power generating element, which is on the negative electrode layer;
   a first circuit which connects the positive electrode terminal and the collecting layer on one end of the positive electrode layer; and
   a second circuit which connects the negative electrode terminal and the collecting layer on the other end of the negative electrode layer.

3. A laminate type battery according to claim 2, wherein the electric circuit member comprises:
   an intermediate electrode terminal which electrically connects the collecting layer in a middle of the power generating element and the external device; and
   a third circuit which connects the intermediate electrode terminal and the collecting layer in the middle of the power generating element.

4. A laminate type battery according to claim 3, wherein a cell controller which adjusts a voltage is connected to the positive electrode terminal, the negative electrode terminal and the intermediate electrode terminal.

5. A laminate type battery according to claim 1, further comprising:
   a insulating member preventing short circuits between the power generating element and the electric circuit member, among the respective layers of the power generating element, the electrode terminals and the circuits, and between outside of the laminate type battery and both of the power generating element and the electric circuit member, wherein at least a part of the insulating member is formed from the first to fifth insulating portions.

6. A laminate type battery according to claim 1, wherein the first collecting layer, the first circuit parts and the first insulating portion are substantially coplanar, the negative electrode layer, the second circuit parts and the second insulating portion are substantially coplanar, the electrolyte layer, the third circuit parts and the third insulating portion are substantially coplanar, the positive electrode layer, the fourth circuit parts and the fourth insulating portion are substantially coplanar, and the second collecting layer, the fifth circuit parts and the fifth insulating portion are substantially coplanar.

7. An assembled battery, comprising:

laminate type batteries, each having a substrate; a power generating element which is disposed on the substrate and has at least one single cell made of a positive electrode layer, an electrolyte layer, a negative electrode layer, a first collecting layer and a second collecting layer, the positive electrode layer, the electrolyte layer and the negative electrode layer being sandwiched by the first and second collecting layers from both sides thereof; and an electric circuit member which is disposed on the substrate and has electrode terminals connected to an external device and circuits connecting collecting layers provided in the power generating element and the electrode terminals, wherein the single cell and at least a part of the circuits are formed by stacking:

a first layer which includes the first collecting layer, first circuit parts and a first insulating portion, wherein the first circuit parts and the first insulating portion are formed in the periphery of the first layer;

a second layer which includes the negative electrode layer, second circuit parts and a second insulating portion, and is stacked on the first layer, wherein the second circuit parts and the second insulating portion are formed in the periphery of the second layer;

a third layer which includes the electrolyte layer, third circuit parts and a third insulating portion, and is stacked on the second layer, wherein the third circuit parts and the third insulating portion are formed in the periphery of the third layer;

a fourth layer which includes the positive electrode layer, fourth circuit parts and a fourth insulating portion, and is stacked on the third layer, wherein the fourth circuit parts and the fourth insulating portion are formed in the periphery of the fourth layer; and a fifth layer which includes the second collecting layers, fifth circuit parts and a fifth insulating portion, and is stacked on the fourth layer, wherein the fifth circuit parts and the fifth insulating portion are formed in the periphery of the fifth layer, and the circuits are formed by stacking the first to fifth circuit parts so as to electrically connect each other, and the laminate type batteries are provided on the same substrate and connected to each other in series or parallel.

8. An assembled battery according to claim 7, wherein the power generating element has a plurality of the single cells connected to each other in series, and the electric circuit member comprises:

a positive electrode terminal electrically connecting the external device and the collecting layer on one end of the power generating element, which is on the positive electrode layer;

a negative electrode terminal electrically connecting the external device and the collecting layer on the other end of the power generating element, which is on the negative electrode layer;

a first circuit which connects the positive electrode terminal and the collecting layer on one end of the positive electrode layer; and a second circuit which connects the negative electrode terminal and the collecting layer on the other end of the negative electrode layer.

9. An assembled battery according to claim 8, wherein the electric circuit member comprises:

an intermediate electrode terminal which electrically connects the collecting layer in a middle of the power generating element and the external device; and a third circuit which connects the intermediate electrode terminal and the collecting layer in the middle of the power generating element.

10. An assembled battery according to claim 9, wherein a cell controller which adjusts a voltage is connected to the positive electrode terminal, the negative electrode terminal and the intermediate electrode terminal.

11. An assembled battery according to claim 7, further comprising:

an insulating member preventing short circuits between the power generating element and the electric circuit member, among the respective layers of the power generating element, the electrode terminals and the circuits, and between outside of the laminate type battery and both of the power generating element and the electric circuit member, wherein at least a part of the insulating member is formed from the first to fifth insulating portions.

12. An assembled battery according to claim 7, wherein the first collecting layer, the first circuit parts and the first insulating portion are substantially coplanar, the negative electrode layer, the second circuit parts and the second insulating portion are substantially coplanar, the electrolyte layer, the third circuit parts and the third insulating portion are substantially coplanar, the positive electrode layer, the fourth circuit parts and the fourth insulating portion are substantially coplanar, and the second collecting layer, the fifth circuit parts and the fifth insulating portion are substantially coplanar.

13. An assembled battery module, comprising:

assembled batteries, each comprising: laminate type batteries, each having: a substrate; a power generating element which is disposed on the substrate and has at least one single cell made of a positive electrode layer, an electrolyte layer, a negative electrode layer, a first collecting layer and a second collecting layer, the positive electrode layer, the electrolyte layer and the negative electrode layer being sandwiched by the first and second collecting layers from both sides thereof; and an electric circuit member which is disposed on the substrate and has electrode terminals connected to an external device and circuits connecting collecting layers provided in the power generating element and the electrode terminals, wherein the single cell and at least a part of the circuits are formed by stacking:

a first layer which includes the first collecting layer, first circuit parts and a first insulating portion, wherein the first circuit parts and the first insulating portion are formed in the periphery of the first layer;

a second layer which includes the negative electrode layer, second circuit parts and a second insulating portion, and is stacked on the first layer, wherein the second circuit parts and the second insulating portion are formed in the periphery of the second layer;

a third layer which includes the electrolyte layer, third circuit parts and a third insulating portion, and is stacked on the second layer, wherein the third circuit parts and the third insulation portion are formed in the periphery of the third layer;

a fourth layer which includes the positive electrode layer, fourth circuit parts and a fourth insulating portion, and is stacked on the third layer, wherein the fourth circuit parts and the fourth insulating portion are formed in the periphery of the fourth layer; and a fifth layer which includes the second collecting layer, fifth circuit parts and a fifth insulating portion, and is stacked on the fourth layer, wherein the fifth circuit parts and the fifth insulating portion are formed in the periphery of the fifth layer, and the circuits are formed by stacking the first to fifth circuit parts so as to electrically connect each other, and the laminate type batteries are provided on the same substrate and connected to each other in series or parallel.

14. An assembled battery module according to claim 13, wherein the power generating element has a plurality of the single cells connected to each other in series, and the electric circuit member comprises:

a positive electrode terminal electrically connecting the external device and the collecting layer on one end of the power generating element, which is on the positive electrode layer;

a negative electrode terminal electrically connecting the external device and the collecting layer on the other end of the power generating element, which is on the negative electrode layer;

a first circuit which connects the positive electrode terminal and the collecting layer on one end of the positive electrode layers; and a second circuit which connects the negative electrode terminal and the collecting layer on the other end of the negative electrode layer.

15. An assembled battery module according to claim 14, wherein the electric circuit member comprises:

an intermediate electrode terminal which electrically connects the collecting layer in a middle of the power generating element and the external device; and a third circuit which connects the intermediate electrode terminal and the collecting layer in the middle of the power generating element.

16. An assembled battery module according to claim 15, wherein a cell controller which adjusts a voltage is connected to the positive electrode terminal, the negative electrode terminal and the intermediate electrode terminal.

17. An assembled battery module according to claim 13, further comprising:

a insulating member preventing short circuits between the power generating element and the electric circuit member, among the respective layers of the power generating element, the electrode terminals and the circuits, and between outside of the laminate type battery and both of the power generating element and the electric circuit member, wherein at least a part of the insulating member is formed from the first to fifth insulating portions.

18. An assembled battery module according to claim 13, wherein the first collecting layer, the first circuit parts and the first insulating portion are substantially coplanar, the negative electrode layer, the second circuit parts and the second insulating portion are substantially coplanar, the electrolyte layer, the third circuit parts and the third insulating portion are substantially coplanar, the positive electrode layer, the fourth circuit parts and the fourth insulating portion are substantially coplanar, and the second collecting layer, the fifth circuit parts and the fifth insulating portion arc substantially coplanar.

* * * * *